United States Patent [19]

Bauer et al.

[11] Patent Number: 5,673,352
[45] Date of Patent: Sep. 30, 1997

[54] FIBER OPTIC MICRO CABLE

[75] Inventors: Fred Henry Bauer, Multnomah, Oreg.; Ted Alan Bookwalter, Clark, Wash.; Edmund James Stuber, Washington, Oreg.

[73] Assignee: Alcatel Submarine Networks, Inc., Portland, Oreg.

[21] Appl. No.: 585,085

[22] Filed: Jan. 12, 1996

[51] Int. Cl.⁶ .................................................. G02B 6/44
[52] U.S. Cl. ........................... 385/114; 385/113; 385/112; 385/106; 385/103
[58] Field of Search ................................. 385/114, 113, 385/100–112

[56] References Cited

U.S. PATENT DOCUMENTS

| | | | |
|---|---|---|---|
| 4,190,319 | 2/1980 | Eggleston | 350/96.23 |
| 4,741,594 | 5/1988 | Suzuki | 350/96.23 |
| 4,852,966 | 8/1989 | Kimmich et al. | 350/96.23 |
| 4,900,126 | 2/1990 | Jackson et al. | 385/114 |
| 5,259,055 | 11/1993 | Cowen et al. | 385/100 |
| 5,440,660 | 8/1995 | Dombrowski et al. | 385/102 |

FOREIGN PATENT DOCUMENTS

| | | | |
|---|---|---|---|
| 259051 | 3/1988 | European Pat. Off. | |
| 61-27514 | 2/1986 | Japan | |
| 61-21281 | 9/1986 | Japan | |
| 1200310 | 8/1989 | Japan | |
| 2164471 | 3/1986 | United Kingdom | 385/114 |

OTHER PUBLICATIONS

"Expendable Miniature Fiber Optic Cable for Underwater Communcations", J. Rosko, G. Loehfelm and K. Cotton (Berk–Tek,Inc.), International Wire & Cable Symposium Proceedings, 1993, pp. 729–733.

*Primary Examiner*—Phan T.H. Palmer
*Attorney, Agent, or Firm*—Ware, Fressola, Van Der Sluys & Adolphson LLP

[57] ABSTRACT

A fiber optic micro cable (10) includes a jacket (14) applied over a core (12) structure. The core (12) includes at least one optical fiber (20) positioned between longitudinally extending structural strength members (17), the strength members and the optical fibers being embedded in a buffer material (24). The strength members and the optical fibers are positioned in a common plane thereby resulting in a generally flat or rectangular shaped cable. The buffer material is selected to provide good adhesion with the jacket and to have a low modules of elasticity to distribute external forces applied to the cable. The jacket material is selected to have good adhesion to the buffer material and to be a tough and abrasion resistant material to further protect the cable core. The jacket is fabricated so that there is slightly more jacket material in the area of the strength members to thereby provide an external profile of the jacket with protrusions in the areas of the strength members. Therefore, when external compressive forces are applied to the cable, the forces are concentrated to first be reacted by the strength members rather than the optical fibers. The strength members provide tensile strength to the cable and have a larger outside diameter than the optical fibers to thereby absorb any crushing forces on the cable.

14 Claims, 2 Drawing Sheets

FIBER OPTIC MICRO CABLE

TECHNICAL FIELD

The present invention relates to fiber optic communication cables, and more particularly, to fiber optic micro cables.

BACKGROUND OF THE INVENTION

It is well known that optical fibers and fiber optic cables including optical fibers provide significant advantages over electrical cables, such as coaxial communication cables, because of the vastly increased band width of optical fibers over electrical (metal) conductors and the reduced weight of optical fiber cables as compared to metal cables. For example, it may be desirable to replace a heavy coaxial communication cable with a fiber optic micro cable which has a fraction of the weight of the coaxial cable while providing the above described increased band width.

As is known in the art, a fiber optic micro cable, which is also referred to as a miniature fiber optic cable, is a cable including one or more optical fibers within a miniature cable structure. The miniature cable size provides a light weight, flexible structure which is relatively easy to handle and which takes up a minimum amount of space for storage and installation.

One known micro cable includes a plurality of small sized wires nested or stranded around a glass fiber and surrounded by a cable jacket. A problem associated with micro cables of this type is the expense and difficulty associated with stranding the small size wires around an optical fiber. The stranding machinery is expensive, and the small wires are difficult to control and subject to breakage during cable manufacture, thereby causing an unreasonable amount of scrap. Additionally, the cable structure fails to provide crush protection to the optical fiber contained therein.

Another problem associated with such optical fiber cables is the bend radius of the cable is limited by the nested or stranded wires. In particular, the minimum bend radius of the cable is limited by the lay length of the wires around the optical fiber. In order to manufacture such a stranded cable with improved bend protection, the lay length of the wires has to be very short, thereby limiting the production rate. Additionally, such a stranded structure occupies a large amount of the cable's available cross section. This limits the thickness of the cable's protective outer sheath when the maximum overall diameter of the cable is fixed.

A further problem with such a stranded or nested cable design is that the resulting cable is difficult to splice. The difficulty arises because of the number of strength elements involved which need to be joined. Additionally, the size of the splice would be large and the ability to retain the overall tensile strength of the cable is questionable.

U.S. Pat. No. 5,259,055 to Cowen et al. describes a fiber optic micro cable which includes an optical fiber core surrounded by a buffer and a protective sheath. The sheath consists of an ultra violet light curable resin impregnated with fibers to enhance the physical strength characteristics of the micro cable. In U.S. Pat. No. 5,440,660 to Dombrowski et al, a similar fiber optic micro cable is disclosed which includes the same optical fiber core surrounded by a buffer and a fiber resin re-enforced protective sheath. Additionally, Dombrowski et al. discloses an overcoat made of an ultra violet light curable second resin to improve the handling characteristics of the micro cable by providing a smooth outer surface over the underlying fiber-impregnated resin layer. The tensile strength of these cable is limited to the strength of the fibers contained in the fiber impregnated resin that coats the buffered optical fiber core. Additionally, although a buffer material is provided around the optical fiber, there are no other structural members within the cable to absorb crushing compressive forces applied to the cable. Therefore, the optical fiber is not protected from crushing forces applied to the cable.

Another known micro cable includes an optical fiber positioned between a pair of strength members, such as steel wires, with a solid extruded jacket of a semi rigid PVC provided around the strength members and fibers. The extruded jacket provides protection from mechanical elements such as abrasion, cut through and kinking. However, this cable design does not provide sufficient crush protection to an optical fiber contained within the cable. The rigid jacket material directly transmits external forces to the optical fibers contained in the cable, and therefore, when crushing forces are applied to such a cable, damage may result to the optical fibers contained therein.

Therefore, a need exists for a fiber optic micro cable which is easy to manufacture, provides adequate crush protection, provides a cable bend radius close to the fiber limit, and which is easy to splice.

SUMMARY OF THE INVENTION

Objects of the invention include the provision of an improved fiber optic micro cable which is easy to manufacture and which provides maximum protection for optical fibers in environments where cable size is to be minimized.

Another object of the present invention is to provide such an improved fiber optic micro cable which protects the optical fibers contained therein from crushing forces.

A still further object of the present invention is to provide such a fiber optic micro cable having improved bend radius, resistance to abrasion, and which may be efficiently stored on a round spool structure.

According to the present invention, a fiber optic micro cable includes a jacket applied over a core structure. The core structure includes at least one optical fiber positioned between longitudinally extending structural strength members, the strength members and the optical fibers being embedded in a buffer material. The strength members and the optical fibers are positioned in a common plane thereby resulting in a generally flat or rectangular shaped cable.

In accordance with one aspect of the present invention, multiple fibers can be positioned between each pair of strength members within the buffer material.

In accordance with another aspect of the present invention, one optical fiber may be positioned between two strength members.

In accordance with a further aspect of the invention, one or more optical fibers may be positioned between a plurality of strength members.

In further accord with the present invention, the buffer material is selected to provide good adhesion with the jacket and to have a low modules of elasticity to distribute external forces applied to the cable. The external forces could be caused by any combination of mechanical, thermal or pressure influence. The external forces are distributed to the strength members to thereby minimize pressure applied to the optical fibers contained within the cable. The jacket material is selected to be a tough and abrasion resistant material to further protect the cable core.

According further to the present invention, the jacket is fabricated so that there is slightly more jacket material in the area of the strength members to thereby provide an external profile of the jacket with protrusions in the areas of the strength members. Therefore, when external compressive forces are applied to the cable, the forces are concentrated to first be reacted by the strength members rather than the optical fibers.

In still further accord with the present invention, the strength members provide tensile strength to the cable and have a larger outside diameter than the optical fibers to thereby absorb any crushing forces on the cable.

A fiber optic micro cable manufactured in accordance with the present invention provides a significant improvement over the prior art. Using the straight lay design of the invention, e.g., the parallel structure of the strength members and optical fibers, provides a cable structure which may be easily manufactured. Additionally, the strength members provide the cable with the desired tensile strength. The larger diameter of the strength members with respect to the optical fibers helps protect the optical fibers contained within the cable against damage in response to crushing forces. Providing the cable jacket with additional jacket material, to thereby form protrusions in the area of the strength members, helps to concentrate crushing forces on to the strength members. This design further minimizes crushing forces transmitted to the optical fibers contained within the cable. The low modulus of elasticity buffer material contained within the cable also helps absorb lateral compressive forces applied to the cable to thereby evenly distribute such forces throughout the cable and minimize compressive forces applied directly to the optical fibers contained therein. The straight lay design of the cable simplifies the joining and splicing procedure such that the original strength and dimension of the cable can be preserved. The cable design of the invention allows a smaller bend radius than prior art micro cables, thereby allowing the use of cable bobbins (spools) with much smaller belly diameters, i.e., the central cylindrical surface of the bobbin may be much smaller. This features enables the user to achieve higher winding efficiency for a given size bobbin.

The foregoing and other objects, features and advantages of the present invention will become more apparent in light of the following detailed description of exemplary embodiments thereof, as illustrated in the accompanying drawings.

DETAILED DESCRIPTION OF THE INVENTION

Figure 1:
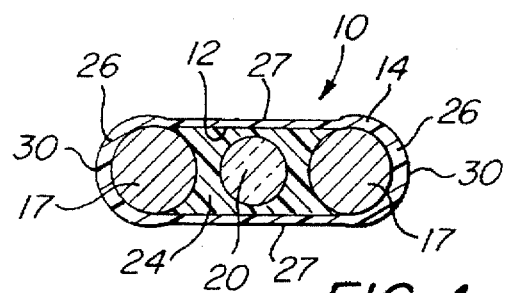
FIG. 1 is a cross-sectional view of a fiber optic micro cable manufactured in accordance with the present invention.

Referring to FIG. 1, a fiber optic micro cable 10 in accordance with the present invention includes a core 12 covered by a jacket 14. The core 12 is a buffered core which includes a pair of longitudinally extending strength members 17 (structural wires) on either side of an optical fiber 20. The strength members 17 and the optical fiber 20 are embedded in a buffer material 24. The strength members 17 and the optical fiber 20 are positioned in a common plane, thereby resulting in a generally flat or rectangular shaped cable structure.

The strength members 17 are selected to provide tensile strength to the micro cable 10 and also provide crush protection to the optical fiber 20 contained within the cable 10. The strength members 17 may be manufactured of a solid metal wire, such as a steel wire or copper wire, or alternatively, the strength members may be stranded metal wires. Additionally, the strength members may be manufactured of high strength non-conductive materials such as fiberglass, reinforced plastic or other high strength dielectric materials. The optical fiber 20 may be of any suitable type known in the art including a central fiber coated by one or more layers of coating material. The optical fiber may be a single mode, multi-mode, dispersion shifted, etc. optical fiber, depending on the desired application of the optical fiber. As is known in the art, the central fiber may be coated with one or more layers of coating material to thereby provide the desired mechanical characteristics of the optical fiber. For example, the fiber may be coated with one or more layers of UV curable coating material to thereby preserve the structural strength and improve the handling qualities of the optical fiber. Hermetically coated fibers may be used if hydrogen protection is required.

The buffer material 24 is a low modulus of elasticity material which provides the desired compression qualities to thereby distribute compressive forces within the micro cable 10 and minimize forces applied to the optical fiber 20. For example, the buffer material may be a UV curable buffer material such as CABLELITE manufactured by DSM Desotech. Alternatively, the buffer material may be a thermoplastic polymer such as HYTREL manufactured by DuPont. It will be understood by those skilled in the art that a variety of buffer materials may be used with the fiber optic micro cable of the present invention, provided that the buffer material provides the desired qualities of having a low modulus of elasticity, and the buffer material provides good adhesion with the jacket material.

Surrounding the cable core 12 is an outer sheath or jacket 14. The jacket material 14 is selected to be tough and abrasion resistant. For example, the jacket 14 may be formed from high density polyethylene (HDPE). Alternatively, other materials such as thermoplastic polymer, e.g., SURLYN manufactured by DuPont, or a UV curable coating, e.g., CABLELITE manufactured by DSM Desotech, may be used as the cable jacket with the cable of the invention. It will also be understood by those skilled in the art that a variety of jacket materials may be used with the fiber optic micro cable of the present invention, provided that the jacket material provides the desired qualities of abrasion resistance and adhesion with the buffer material.

Figure 4:
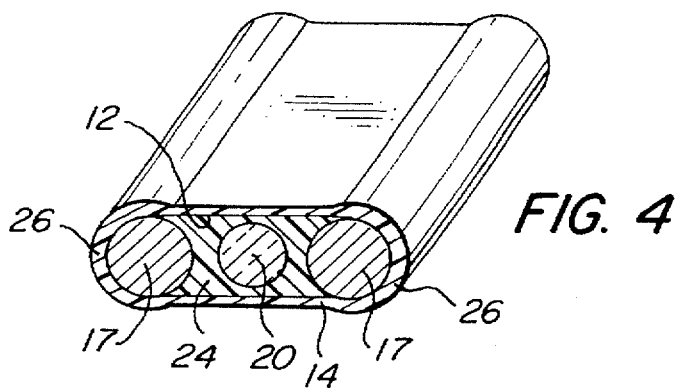
FIG. 4 is a perspective cross-sectional view of the fiber optic micro cable of FIG. 1.

The jacket 14 is fabricated so that there is slightly more material in the region of the strength members such that the profile of the completed cable includes protrusions 26 (FIGS. 1 and 4) in the cable jacket 14 in the area of the strength members 17. The extra jacket material in the region of the strength member helps to concentrate the crushing forces applied to the cable 10 directly to the strength members 17 and thus relieve some of the stress on the optical fibers 17 contained within the cable 10. This feature thereby increases the ability of the cable to withstand crushing forces applied to the exterior of the cable.

The strength members 17 are sized to give the cable its required tensile strength. Additionally, the strength members 17 are selected to have a slightly larger diameter than the optical fibers so that crushing forces are first applied to the strength members 17 rather than the optical fibers to protect the optical fiber in the crush mode. For example the nominal diameter of the strength members 17 is approximately 0.40 mm while the nominal diameter of the coated optical fiber is approximately 0.25 mm. The overall dimensions of the cable 10 illustrated in FIG. 1 including a pair of strength members 17 and a single optical fiber 20 within the core 24 is approximately 1 mm by 1.5 mm.

The micro cable of the present invention provides protection to an optical fiber contained therein in two different modes of crushing forces. First, as described above, when crushing forces are applied to the longer or flat planes 27 of the cable 10, the larger diameter of the strength members 17 causes the strength members 17, as opposed to the optical fiber 20, to absorb the crush forces applied to the cable 10. Additionally, the increased thickness of jacketing material 26 in the area of the strength members 17 further helps concentrate the crushing forces on to the strength members. Any crushing forces that are applied to the core 12 are equally distributed throughout the core 12 by the low modulus of elasticity buffer material 24 such that local concentrations of crushing forces do not damage the optical fiber 20.

The present invention provides a second mode of crush protection in the lateral direction. If crushing forces are applied to the short or round edges 30 of the cable 10, the cushioning effect of the buffer material 24 helps distribute these crushing forces throughout the core 12.

An added advantage of the present invention is that the flat construction of the micro cable causes the cable to have a natural tendency to conform to the flat dimension of the cable when the cable is bent around obstacles. Therefore, the cable is naturally exposed to the stronger mode of crush protection by exposing the flat surface 27 of the cable to external crushing forces. The flat cable design also lends itself to easy storage of the cable on a spool because the naturally flat design of the invention packs more effectively than a round structure. The cable design of the invention allows a smaller bend radius than prior an micro cables, thereby allowing the use of cable bobbins (spools) with much smaller belly diameters. This features enables the user to achieve higher winding efficiency for a given size bobbin. Because the invention does not use stranded or nested wires around a central optical fiber, problems associated with limited bend radius of the cable are eliminated. Additionally, the straight lay of the invention simplifies splicing of the cable. The strength member 17 and fibers 20 can be easily spliced and the jacket 14 restored with a diameter close to the original un-spliced cable. Additionally, the tensile strength of the spliced cable will be near that of the original un-spliced cable.

Figure 2:
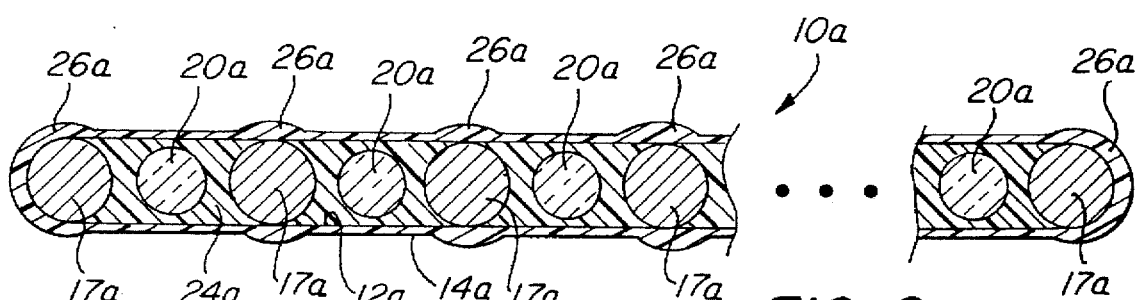
FIG. 2 is a cross-sectional view of a second embodiment of the fiber optic micro cable of FIG. 1.

The invention has been described thus far as containing a single optical fiber 20 positioned between a pair of strength members 17 within a core 12 of the micro cable 10. However, the cable of the invention may be provided with a plurality of optical fibers and strength members within the core of the cable. Referring to FIG. 2, a second embodiment of the invention 10a includes a plurality of parallel running strength members 17a. Between each of the strength members 17a is positioned a single optical fiber 20a. As with the embodiment of FIG. 1, the strength members 17a and optical fibers 20a are embedded within a core 12a of buffer material 24a. The core 12a is coated with a protective jacket 14a (outer sheath). The jacket material is of an increased thickness 26a at least in the area of the end strength members, i.e., the strength members on the outside edges of the cable 10a. However, the jacket material 14 may be of an increased thickness 26a in all of the areas of the strength member 17a, as illustrated in FIG. 2, to thereby provide superior crush protection throughout the width of the cable 10a so that optical fibers 20a are not damaged when the cable is exposed to compressive or crushing forces.

Figure 3:
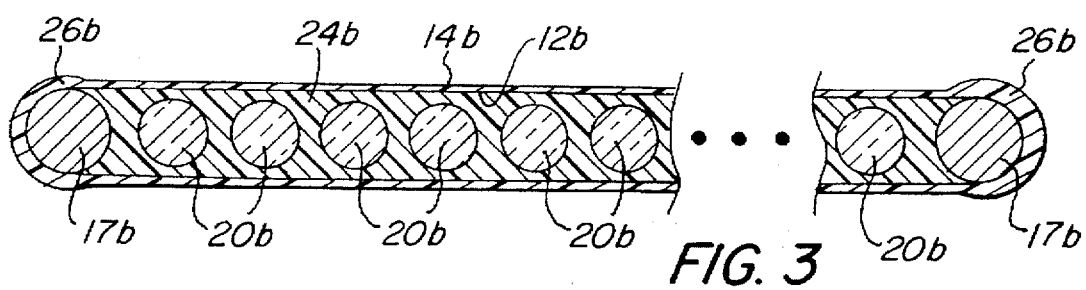
FIG. 3 is a cross-sectional view of a third embodiment of the fiber optic micro cable of the invention.

Referring now to FIG. 3, a third embodiment of the invention includes a plurality of optical fibers 20b positioned between a pair of strength members 17b. In this application, the number of optical fibers 20b positioned between the strength members 17b is selected to provide the superior crush protection qualifies to the cable while also maximizing the optical fiber content within the cable. As with the other embodiments, the strength members 17b and optical fibers 20b are included in a core 12b of buffer material 24b, and the core 12b is surrounded by a protective jacket 14b. Excess jacket material 26b is provided in the area of the strength member 17b. Additional strength member 17b may be positioned within the cable as necessary to preserve the superior crush resistant characteristics of the cable.

Figure 5:
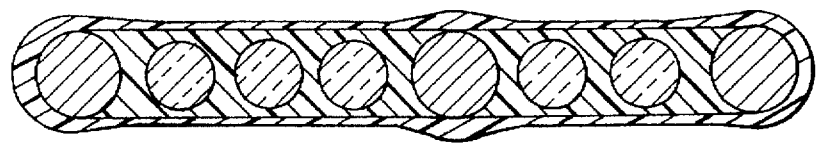
FIG. 5 is a cross-sectional view of a fourth embodiment of the invention.
Figure 6:
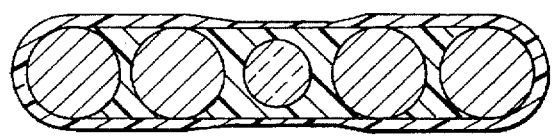
FIG. 6 is a cross-sectional view of a fifth embodiment of the invention.
Figure 7:
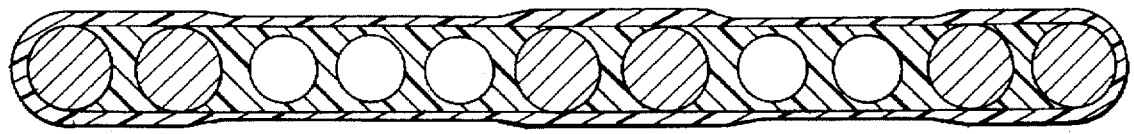
FIG. 7 is a cross-sectional view of a sixth embodiment of the invention.

As will be understood by those skilled in the art, various combination of optical fiber and strength members may be provided in a fiber optic micro cable manufactured in accordance with the invention. For example, as illustrated in FIG. 5, a cable may be provided having a plurality of optical fibers between pairs of strength members. Similarly, as illustrated in FIG. 6, two or more strength members may be provided on at least one side of each optical fiber. Additionally, as illustrated in FIG. 7, a plurality of strength members may be provided on at least one side of a plurality of optical fibers.

If the desired, the strength member 17, 17a, 17b (FIGS. 1–3) may be an electronic signal transmission media, such as copper wires, for carrying electrical current to power devices, such as optical repeaters. Alternatively, the copper wire may be used to transmit electronic data and signaling. In this case, the buffer material 24, 24a, 24b and the jacket material 14, 14a, 14b is selected to provide proper insulation for the copper wires.

Although the invention has been described with respect to exemplary embodiments thereof, the foregoing and various other additions and omissions may be made therein and thereto without departing from the spirit and scope of the present invention.

We claim:

1. A fiber optic micro cable, comprising:
   a core including:
   at least one optical fiber;
   at least two strength members;
   said optical fibers and said strength members longitudinally extending in a common plane and embedded in a buffer material; and
   a jacket surrounding said core, wherein all void spaces within said jacket are completely filled by said core including said optical fibers, said strength members and said buffer material, said jacket having a variable thickness such that said jacket is thicker in jacket areas adjacent to said strength members than in jacket areas adjacent to said optical fibers.

2. A fiber optic micro cable according to claim 1, wherein said buffer material has a low modulus of elasticity and provides good adhesion with said jacket.

3. A fiber optic micro cable according to claim 2, wherein said jacket material is abrasion resistant and provides good adhesion with said buffer material.

4. A fiber optic micro cable according to claim 3, wherein the diameter of said strength members is larger than the diameter of said optical fibers.

5. A fiber optic micro cable according to claim 1, wherein said optical fibers and said strength members are arranged in said core such that at least two strength members are positioned on at least one side of a plurality of optical fibers.

6. A fiber optic micro cable according to claim 1, wherein said optical fibers and said strength members are arranged in said core such that only one optical fiber is positioned between each pair of strength members.

7. A fiber optic micro cable according to claim 1, wherein said optical fibers and said strength members are arranged in said core such that a plurality of optical fibers are positioned between each pair of strength members.

8. A fiber optic micro cable according to claim 1, wherein said optical fibers and said strength members are arranged in said core such that at least two strength members are positioned on at least one side of each optical fiber.

9. A fiber optic cable according to claim 1, wherein said strength members are made from high strength, non-conductive materials.

10. A fiber optic cable according to claim 1, wherein said cable has a flat structure.

11. A fiber optic cable according to claim 1, wherein said cable has a rectangular shaped structure with said optical fibers and said strength members being positioned in a single common plane within said structure.

12. A fiber optic micro cable according to claim 1, wherein said jacket material is abrasion resistant and provides good adhesion with said buffer material.

13. A fiber optic micro cable according to claim 1, wherein the diameter of said strength members is larger than the diameter of said optical fibers.

14. A fiber optic cable according to claim 1, wherein said strength members are electronic signal transmission media, and wherein said buffer material and said jacket are selected to provide electrical insulation to said buffer material.

* * * * *